United States Patent
Long

(10) Patent No.: US 7,856,754 B2
(45) Date of Patent: Dec. 28, 2010

(54) PLANT TIE

(76) Inventor: Joshua A. Long, P.O. Box 961, Canby, OR (US) 97013

( * ) Notice: Subject to any disclaimer, the term of this patent is extended or adjusted under 35 U.S.C. 154(b) by 0 days.

(21) Appl. No.: 12/157,840

(22) Filed: Jun. 13, 2008

(65) Prior Publication Data

US 2008/0313957 A1 Dec. 25, 2008

(51) Int. Cl.
*A01G 17/04* (2006.01)
(52) U.S. Cl. .............................. 47/47; 47/46
(58) Field of Classification Search .............. 47/44, 47/45, 46, 47, 41.01, 55; 24/30.5 R, 27, 24/30.5 T, 5, 16 R; 428/24
See application file for complete search history.

(56) References Cited

U.S. PATENT DOCUMENTS

| | | | |
|---|---|---|---|
| 913,962 A | 3/1909 | Liddy | |
| 2,973,597 A * | 3/1961 | Powell | 40/665 |
| 3,324,592 A * | 6/1967 | Prenner et al. | 47/47 |
| 3,909,979 A | 10/1975 | Perez | |
| 7,011,879 B1 | 3/2006 | Contreras et al. | |

OTHER PUBLICATIONS

International Search Report for PCT/US06/47243 dated July 30, 2008.

* cited by examiner

*Primary Examiner*—T. Nguyen
(74) *Attorney, Agent, or Firm*—Klarquist Sparkman, LLP

(57) ABSTRACT

A plant tie and a chain of plant ties are disclosed. The plant tie can include an expandable portion, such as a length of tape, and two twistable portions, such as two lengths of wire. The expandable portion can span a gap between the twistable portions. The plant tie can be wrapped around a portion of a plant and secured in place by twisting the twistable portions. Once in place, the plant tie can expand to accommodate movement and/or growth of the plant to which it is attached. The disclosed chain of plant ties can include multiple individual plant ties linked in series for ease of manufacture and use.

14 Claims, 3 Drawing Sheets

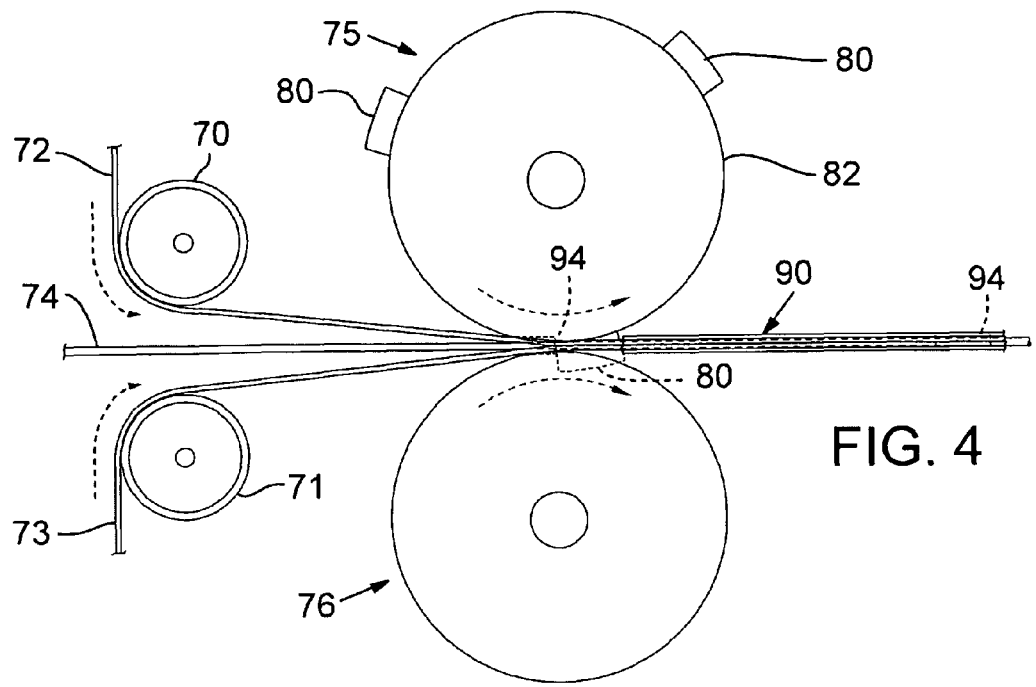
FIG. 4
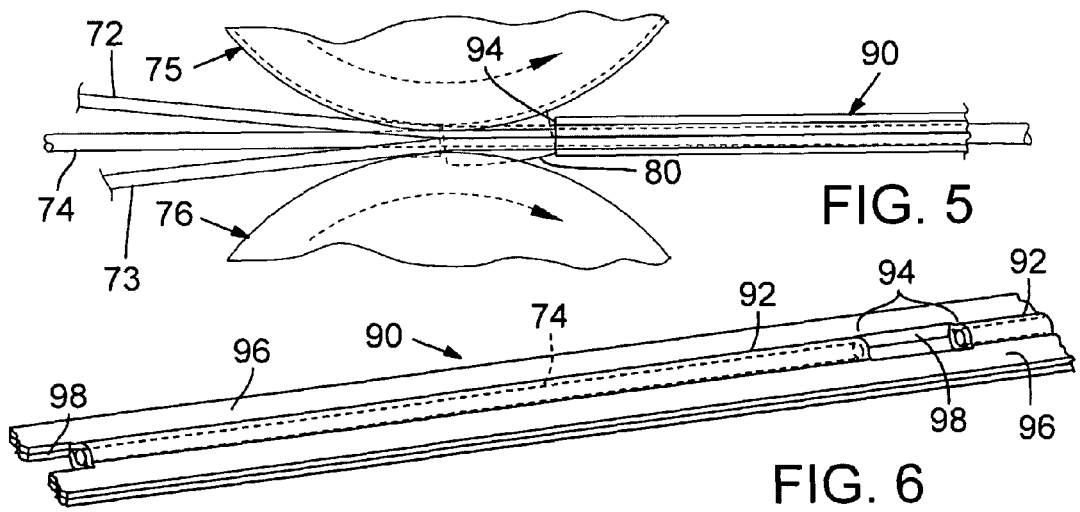
FIG. 5
FIG. 6

PLANT TIE

CROSS REFERENCE TO RELATED APPLICATIONS

This application claims the benefit of International Application No. PCT/US2006/047243, filed on Dec. 11, 2006, which claims the benefit of U.S. Provisional Application No. 60/750,284, filed Dec. 13, 2005, both of which are incorporated herein by reference.

FIELD

This disclosure concerns plant supports for attaching portions of plants to support structures.

BACKGROUND

External control of plant growth often is used to improve the health and/or appearance of plants. For example, some plants are attached to fixed objects, such as stakes, as they grow. Plants supported in this manner adjust to the applied constraints and grow in the desired direction. Among other benefits, this technique can be used to promote vertical growth in saplings.

Many types of plant supports are known for attaching portions of plants to support structures. For example, twist ties having a malleable inner element, such as a wire, and an attached outer cover have been used for this purpose. Conventional twist ties, however, do not stretch longitudinally and cannot expand with a plant as it grows. If a conventional twist tie is secured around the trunk of a sapling and is not repositioned as the sampling grows, it eventually will cut into the sapling causing it serious injury. Plant supports that do not expand also tend to damage plants by abrasion during normal movement of the plants, such as movement caused by wind.

Some plant supports have been developed that do allow for expansion and/or movement of the plant portions to which they are attached. For example, U.S. Pat. No. 6,122,859 discloses "a plant tie . . . comprising a soft, flexible, elastic loop." The plant tie disclosed in U.S. Pat. No. 6,122,859, however, is complicated to install. Such a plant tie is not convenient and is not well suited for operations requiring the efficient cultivation of large numbers of plants, such as nursery and farming operations.

SUMMARY

The disclosed plant tie embodiments can include first, second and third elongated, flexible members. The second and third members can be attached to the first member. For example, the second and third members can be at least partially covered by, embedded or contained within the first member. The first member can comprise an expandable material making the first member elongatable, i.e., expandable in a longitudinal direction defined by a longer axis of the plant tie. Stated differently, the first member can be stretchable or longitudinally-expandable. In contrast, the second and third members can be substantially non-elongatable, non-stretchable or non-longitudinally-expandable. The plant tie can be configured to be wrapped around a portion of a plant such that the first member contacts the portion of the plant. The plant tie then can be secured in place by twisting the second member and the third member around each other. Once in place, the plant tie can expand to accommodate movement and/or growth of the portion of the plant to which it is attached.

In some embodiments, the first member spans a gap between an end of the second member and an end of the third member along the length of the plant tie. Expansion can occur along this gap. In some embodiments, the first member can define an opening. For example, the first member can define an opening with a gap between the end of the first member and the end of the second member.

The first member can comprise a tape. The second and/or third members can comprise wires. With respect to materials, the first member can comprise a material with a modulus of elasticity between greater than zero and about 5 GPa. In some embodiments, the first member comprises a vinyl polymer. The second and/or third members can comprise a material with a modulus of elasticity between about 5 and about 500 GPa. In some embodiments, the second and/or third members comprise a metal. The overall plant tie can have a substantially solid cross section along substantially its entire length.

The plant tie also can be configured to be connected to other plant ties, such as end-to-end in a configuration referred to herein as a "chain" of plant ties. Such a chain of plant ties can allow for convenient dispensing, such as from a roll. The disclosed chain of plant ties can include an expandable member or a series of expandable member sections and a series of twisting member sections attached to the expandable member or the series of expandable member sections. For example, the twisting member sections can be at least partially covered by, embedded or contained within the expandable member or the series of expandable member sections. The overall chain of plant ties can have a substantially solid cross section. The chain of plant ties can be configured such that an individual plant tie can be removed from the chain of plant ties, e.g., by cutting it at a point along the length of one of the twisting member sections. Once removed, the individual plant tie can have a portion of one of the twisting member sections at each of its respective ends and a gap between the portions of the twisting member sections spanned by a portion of the expandable member.

According to another aspect, disclosed embodiments of plant ties can include a first elongatable member. These embodiments also can include at least first and second substantially non-elongatable members disposed within the at least first elongatable member and spaced longitudinally of each other to define respective first and second securing portions. These embodiments can have a gap between the respective first and second securing portions. A portion of the at least first elongatable member can span the gap to define an elongatable plant engaging portion. The plant engaging portion can have a flat side. The plant engaging portion can define a slot. In some instances, the at least first and second substantially non-elongatable members include a plurality of wire segments.

The at least first elongatable member can include at least a first ply of elongatable material and a second ply of elongatable material joining the first ply. The substantially non-elongatable members disposed within the at least first elongatable member can be disposed between the first ply and the second ply.

The first and second securing portions can be configured for twisting together, and the plant engaging portion can be configured to secure a plant to a support when the securing portions are twisted together.

According to yet another aspect, methods are disclosed for forming a plant tie that include forming an elongatable member overlying at least one substantially non-elongatable member disposed therein. The at least one substantially non-elongatable member can be segmented to form at least two adjacent, non-elongatable segments spaced longitudinally of each other to form a gap therebetween with at least one elongatable portion spanning the gap, thereby forming a chain of plant ties.

Forming the elongatable member can include joining a first ply of elongatable material to a second ply of elongatable material with a substantially non-elongatable member positioned between the first ply and the second ply. Forming the elongatable member can include extruding an elongatable material.

The act of segmenting the non-elongatable member can include punching an opening that removes a segment of the substantially non-elongatable member and a corresponding portion of the overlying elongatable member. A continuous portion of the elongatable member can be maintained adjacent to the removed segment to form the at least one elongatable portion.

In some embodiments, the at least one substantially non-elongatable member can include at least two substantially non-elongatable members. In these embodiments, the act of segmenting the at least one substantially non-elongatable member can include inserting and longitudinally spacing the at least two substantially non-elongatable members within the elongatable member.

In some embodiments, at least one of the plurality of adjacent, non-elongatable segments is cut to separate the plant tie from the chain of plant ties. In other embodiments, the chain of plant ties is wound about a spool.

According to still another aspect, a chain of plant ties comprising at least one elongatable portion spanning at least one gap between at least two adjacent non-elongatable portions can be provided, and one of the at least two non-elongatable portions can be cut a pre-determined distance from the at least one gap to form the at least one plant tie.

BRIEF DESCRIPTION OF THE DRAWINGS

FIG. 4 illustrates a portion of an exemplary embodiment of an apparatus for forming an embodiment of the disclosed plant ties.

FIG. 5 illustrates a portion of the apparatus shown in FIG. 4.

FIG. 6 illustrates a perspective view of an embodiment similar to that shown in FIG. 2A.

DETAILED DESCRIPTION

Throughout this disclosure, the singular terms "a," "an," and "the" include plural referents unless the context clearly indicates otherwise. Similarly, the word "or" is intended to include "and" unless the context clearly indicates otherwise.

As used herein, the terms "elongatable" and "longitudinally-expandable" refer to structures and materials that deform either elastically or non-elastically in response to an applied force. This force can be any force less than the force exerted by growth of a portion of a plant to which the elongatable or longitudinally-expandable material or structure is attached. For example, an elongatable or longitudinally-expandable material or structure can have a modulus of elasticity between greater than zero and about 5 GPa, such as between about 0.01 and about 4 GPa or between about 0.1 and about 3 GPa. In contrast, a non-elongatable or non-longitudinally-expandable material or structure can have a modulus of elasticity between about 5 and about 500 GPa, such as between about 10 and about 500 GPa or between about 20 and about 500 GPa.

As used herein, the term "plant" refers to any non-animal living organism, such as any member of the kingdom Plantae, including, but not limited to, trees, vines, shrubs and herbs.

Disclosed herein are embodiments of plant ties and embodiments of chains of plant ties. Embodiments of the disclosed plant ties can be used to fasten a portion of a plant to another object, such as another portion of the plant or a support structure. Like a conventional twist tie, some embodiments can be secured in place by a simple twisting action. However, unlike a conventional twist tie, these embodiments also can allow for growth and/or movement of the plant portion to which they are attached. Embodiments of the disclosed plant tie generally are compact, easy to manipulate by hand and inexpensive to manufacture.

Figure 1A:
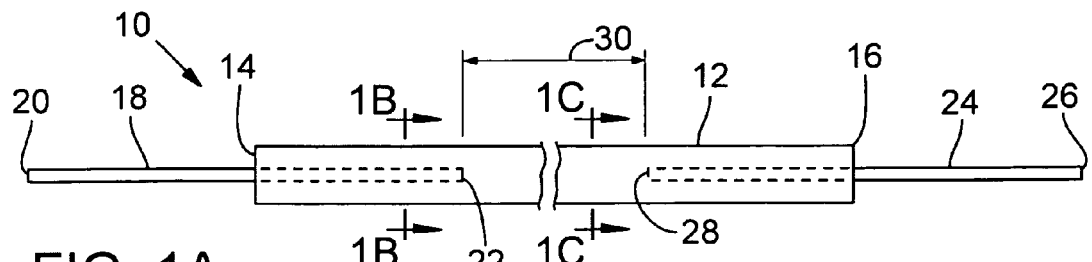
FIG. 1A is a plan view of an embodiment of the disclosed plant tie.

FIG. 1A is a plan view of one embodiment of the disclosed plant ties. The illustrated plant tie 10 includes a first elongated, flexible member 12 having a first end 14 and a second end 16, a second elongated, flexible member 18 having a first end 20 and a second end 22 and a third elongated, flexible member 24 having a first end 26 and a second end 28. Portions of the second and third members 18, 24 adjacent to their first ends 20, 26 are exposed, while portions of the second and third members 18, 24 adjacent to their second ends 22, 28 are embedded within the first member 12. The lengths of the exposed and embedded portions of the second and third members 18, 24 can vary. In some embodiments, substantially the entire lengths of the second and third members 18, 24 are embedded within the first member 12.

Figure 1B:
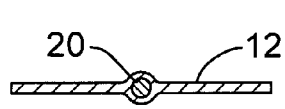
FIG. 1B is a cross sectional view of the plant tie shown in FIG. 1A taken along the line 1B-1B in FIG. 1A.
Figure 1C:
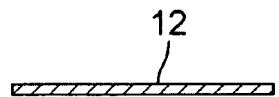
FIG. 1C is a cross sectional view of the plant tie shown in FIG. 1A taken along the line 1C-1C in FIG. 1A.

As shown in FIG. 1A, the first member 12 spans a gap 30 between the second end 22 of the second member 18 and the second end 28 of the third member 24. FIG. 1B shows the cross section of the plant tie 10 at a point spanned by both the first member 12 and the second member 18. FIG. 1C shows the cross section of the plant tie 10 at a point within the gap 30.

In some embodiments, the presence of the gap 30 allows the overall plant tie 10 to expand to accommodate movement and/or growth of a portion of a plant to which it is attached. For example, the first member 12 can comprise an expandable material making the first member 12 longitudinally-expandable. The first member 12 also can comprise a material and/or structure that is not inherently expandable, but is made, e.g. woven, into an expandable form. In some embodiments, the second and third members 18, 24 are substantially non-longitudinally-expandable relative to the first member 12. Thus, as force is exerted on the plant tie 10, such as by the radial growth of a tree trunk to which it is attached, the plant tie 10 will tend to expand in length along the gap 30, thus elongating the plant tie 10.

The second and third members 18, 24 can be configured to promote easy coupling of the plant tie 10, such as to an object or to another plant tie, e.g., in a closed loop around a portion of a plant and another portion of the plant or a support structure. For example, the second and third members 18, 24 can be configured to secure the plant tie 10 in a closed loop when they are twisted around each other. Twisting typically takes less time than other methods of closure, such as tying. This can result in substantial labor savings in large-scale cultivation operations. Moreover, unlike stapling or clipping, twisting typically forms a highly stable closure and requires no specialized equipment.

The plant tie 10 and its components can take various forms. Typically, the first, second and third members 12, 18, 24 all are elongated. In the embodiment shown in FIGS. 1A-1C, the first member 12 is a substantially flat tape and the second and third members 18, 24 are substantially round wires. The overall plant tie 10 has a low profile cross section, with a substantially flat cross section along the gap 30, a substantially round cross section along the exposed portions of the second and third members 18, 24 and a cross section in the form of a flat tape with a central bulge along the lengths in which portions of the second and third members 18, 24 are embedded within the first member 12. In certain other embodiments, the plant tie 10 has a substantially flat or a substantially round cross section along substantially its entire length. The plant tie 10 also can have a substantially solid cross section along substantially its entire length. In other words, the plant tie 10 can have a form that includes substantially no internal voids. This can occur, for example, if the second and third members 18, 24 are securely embedded within the first member 12.

Typically, the first member 12 is more pliable and less abrasive than the second and third members. Thus, the plant tie 10 can be configured such that the first member 12 is the primary contact between the plant tie 10 and the plant to which it is attached. In the embodiment shown in FIGS. 1A-1C, the second and third members 18, 24 are partially embedded in the first member 12, so the first member 12 will contact the plant regardless as to how the plant tie 10 is oriented. In some other embodiments, the second and third members 18, 24 or portions of the second and third members 18, 24 are affixed to an external surface of the first member 12 rather than being embedded in the first member 12. In these embodiments, the plant tie 10 can be installed such that the surface of the first member 12 to which the second and third members 18, 24 are attached is oriented away from the plant.

Embodiments of the disclosed plant tie 10 can comprise many different materials. In some embodiments, the materials can be selected for suitable weather resistance to prevent the plant tie 10 from disintegrating after exposure to the environment. The first member 12 can comprise a material sufficiently expandable to allow the plant tie 10 to expand as the plant to which it is attached moves and/or grows. In contrast, to promote closure by twisting, the second and third members 18, 24 can comprise a material that is malleable, but also sufficiently rigid to be secured by a twist. Examples of materials well suited for incorporation into the first member 12 include vinyl polymers, such polystyrene, polyvinylchloride, polyethylene, polypropylene and polybutadiene. In some embodiments, the first member 12 comprises conventional garden tape. Examples of materials well suited for incorporation into the second and third members 18, 24 include metals, such as steel, aluminum and copper. The metal can be galvanized to reduce corrosion.

The second and third members 18, 24 can be secured within the first member 12, for example, by a tight fit (i.e., friction). In some embodiments, the second and third members 18, 24 also are glued to the first member 12. The glue can be selected to be flexible when dry and to be compatible with the materials to be bonded. For example, in embodiments in which the first member 12 is plastic and the second and third members 18, 24 are metal, the glue can be selected to bond plastic and metal. In other embodiments, the first member 12 is secured in place by heat shrinking it to or over the second and third members 18, 24.

Figure 2A:
FIG. 2A is a plan view of an embodiment of the disclosed chain of plant ties.
Figure 2B:
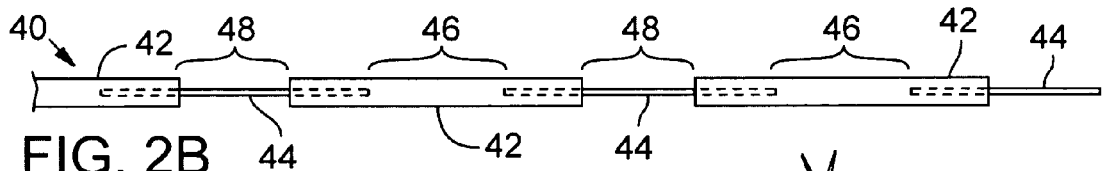
FIG. 2B is a plan view of an embodiment of the disclosed chain of plant ties.
Figure 8:
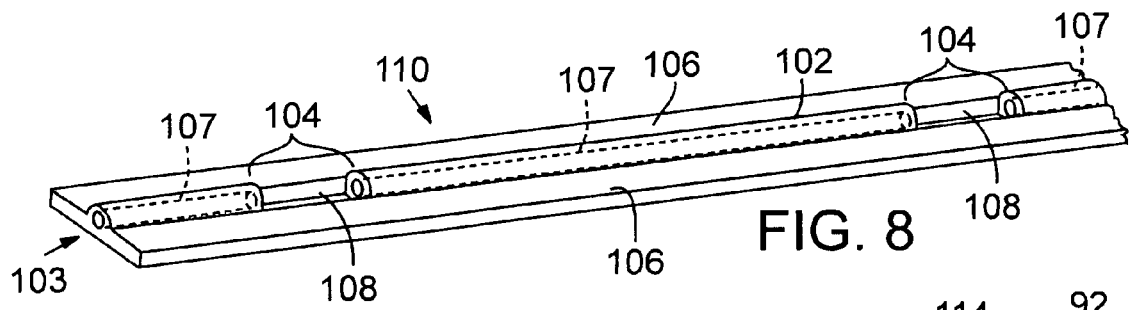
FIG. 8 illustrates a portion of an embodiment chain of plant ties formed by an extruding technique.
Figure 9:
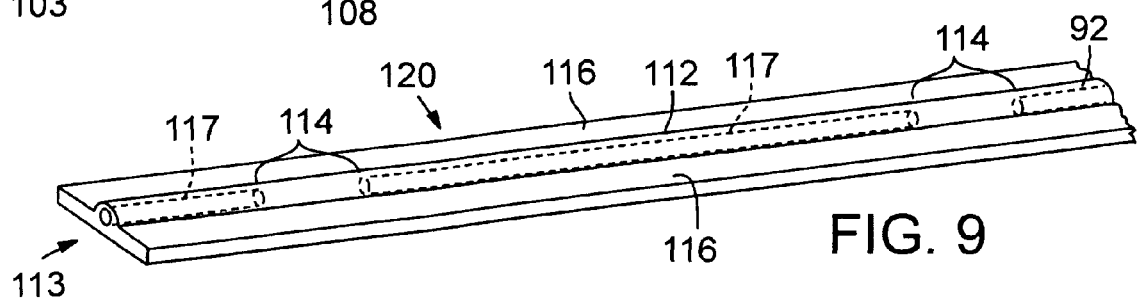
FIG. 9 illustrates an alternative embodiment of a chain of plant ties formed by an extruding technique.

Embodiments of the disclosed plant tie 10 can be designed for ease of manufacture. For example, some embodiments can be manufactured in long chains from which individual plant ties can be separated. FIGS. 2A, 2B, 6, 8 and 9 show portions of such chains. FIG. 2A shows a chain 32 including a continuous, expanding member 34 and a series of twisting member sections 36 embedded within the expanding member 34 at even intervals. The expanding member 34 extends across gaps 38 between the twisting member sections 36. FIG. 2B shows a chain 40 including spaced-apart expanding member sections 42 and spaced-apart twisting member sections 44. The expanding member sections 42 span gaps 46 between the twisting member sections 44 and the twisting member sections 44 span gaps 48 between the expanding member sections 42. FIGS. 6, 8 and 9 illustrate perspective views of other embodiments of chains 90, 110, 120, which are more fully described below.

Figure 2C:
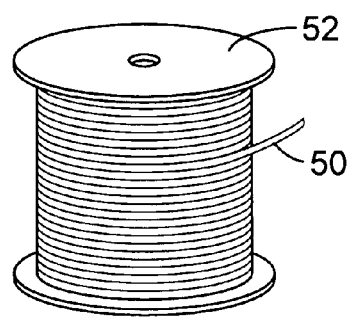
FIG. 2C is a perspective view of a spool of the chain of plant ties shown in FIG. 2A.

With regard to the embodiments shown in FIGS. 2A, 2B, 6, 8 and 9, an individual plant tie can be separated from the chains 32, 40, 90, 110, 120 such as by cutting them at a point along the lengths of the twisting member sections 36, 44, 92, 102, 112. The cut can be made so that portions of the twisting member sections 36, 44, 92, 102, 112 are present at each end of the newly separated plant tie and at least one gap 38, 46, 94, 104, 114 is positioned between the portions of the twisting member sections 36, 44, 92, 102, 112. The length of the plant tie can be varied by cutting the chains 32, 40, 90, 110, 120 at different positions along the twisting member sections 36, 44, 92, 102, 112 or by skipping one or more twisting member sections 36, 44, 92, 102, 112. For ease of storage and dispensing, the chains 32, 40, 92, 102, 112 can be wound around spools. FIG. 2C shows a chain 50 wrapped around a spool 52.

Figure 3:
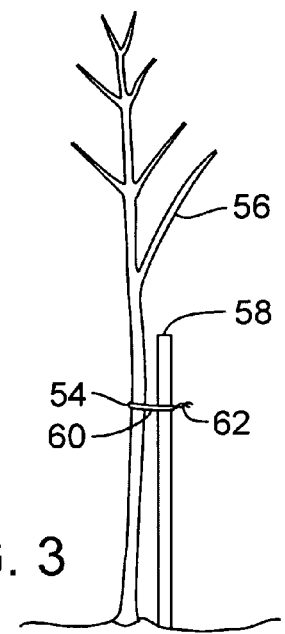
FIG. 3 is a perspective view of a sapling fastened to a stake by the plant tie shown in FIG. 1A.

FIG. 3 shows a plant tie 54 secured around a sapling 56 and a stake 58. The plant tie 54 includes a cradle 60 in contact with the sapling 56 and a twisted closure 62 adjacent to the stake 58. In addition to training saplings, embodiments of the disclosed plant tie can be used, for example, to guide the growth of branches and to support crops.

FIG. 4 illustrates a portion of an exemplary apparatus for forming an embodiment of the disclosed plant ties, such as, for example, the embodiment illustrated in FIG. 6. Referring to FIG. 4, the exemplary apparatus comprises a first pair of rollers 70, 71 for guiding a first ply 72 and a second ply 73, respectively. The first ply 72 and the second ply 73 can be lengths of elongatable tape or other suitable strip material stored on respective spools (not shown) that feed the illustrated portion of the apparatus. As shown, the first and second plies 72, 73 define opposing sides that can be joined together between a second pair of rollers 75, 76 to form an elongatable member. In some embodiments, one or both of the opposing sides have an adhesive applied thereon to facilitate joining of the opposing sides.

As also shown by FIG. 4, a wire 74 can be fed between the respective first and second plies 72, 73 such that the plies 72, 73 and wire 74 form a continuous assembly. In the illustrated embodiment, the rollers 75, 76 comprise a roller portion 82 and a plurality of evenly spaced die portions 80.

As the plies 72, 73 and wire 74 move to the right with the wire 74 sandwiched between the plies, the rollers 75, 76 rotate counterclockwise and clockwise, respectively, and a die portion 80 contacts the continuous length of material, cutting and/or punching a desired feature, such as a slot, at regular intervals. As shown by FIG. 6, a series of openings 98 formed in the continuous assembly segments the otherwise continuous wire 74 into discrete lengths, and also forms a corresponding series of elongatable members configured to be wrapped around a portion of a plant (e.g., the slot being formed in the gap 94 between the discrete lengths of wire forming the individual twisting members 92 provides an elongatable section having no non-elongatable member). Consequently, a chain of plant ties 90 can have a continuous expandable member formed of the first and second plies 72, 73, and a plurality of substantially non-elongatable portions formed by the segmented wire 74. A chain of plant ties 90 so formed can be fed onto a spool (not shown) for shipping and/or storage.

Individual plant ties can be separated from the chain 90 by cutting the wire 74 and a full width of the overlying material 96 at a location between adjacent gaps 94. For example, a spooled chain of plant ties can be fed into cutters on an apparatus separate from that shown in FIGS. 4 and 5, such as an apparatus on a separate assembly line, or in a separate factory altogether.

In alternative embodiments, the rollers 75, 76 do not include die portions 80 for segmenting the wire as described above. In these embodiments, the assembly of joined plies 72, 73 and wire 74 forms a continuous length of material that can be wound about a spool (not shown).

A continuous length, such as the one formed using the apparatus of FIGS. 4 and 5, or the extrusion apparatus of FIG. 7A (described below), can be formed into a chain of plant ties by segmenting the wire 74 or other continuous non-elongatable member 107 in a roller die apparatus, such as by feeding the continuous length of material through a pair of roller dice having cutting features similar to the die portions 80. In other embodiments, the rollers 75, 76 can define the illustrated die portions 80 as well as additional die portions (not illustrated) for cutting the wire and the full width of the plies between the gaps to form individual plant ties in a continuous manner. Alternatively, a vertical die apparatus, such as the one shown in FIG. 7B, can be used to form an assembly having a continuous length into a chain of plant ties, as more fully described below.

Figure 7A:
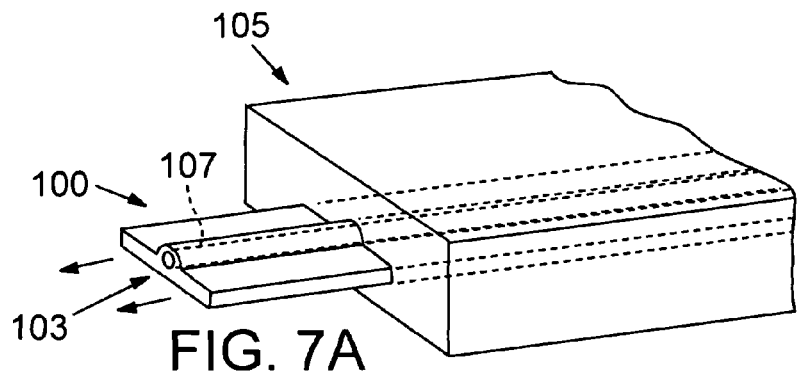
FIG. 7A illustrates a perspective view of an intermediate stage of forming a chain of plant ties using an extrusion technique.

Turning to FIG. 7A, an intermediate stage of an extruding technique is illustrated. In an exemplary extrusion, an elongatable member 100 can be continuously extruded from an extrusion die 105, and a substantially non-elongatable member 107, such as for example a continuous length of wire or a plurality of wire segments (e.g., wire segments 117 shown in FIG. 9), can be inserted into a portion of the extruded elongatable member 100. In embodiments inserting a continuous length of wire, an assembly will be formed having a continuous elongatable member 100 and a continuous non-elongatable member 107 disposed throughout substantially the entire length of the extruded assembly. Alternatively, a plurality of discrete lengths of a substantially non-elongatable member 107 can be inserted to form a chain of plant ties, as described below with regard to FIG. 9.

The extrusion die 105 can define an extrusion opening of a variety of shapes, providing the first member with one of a variety of cross-sectional profiles. In the illustrated embodiment of FIG. 7A, the cross-sectional profile provides a substantially flat side 103, which will be discussed in more detail below.

Figure 7B:
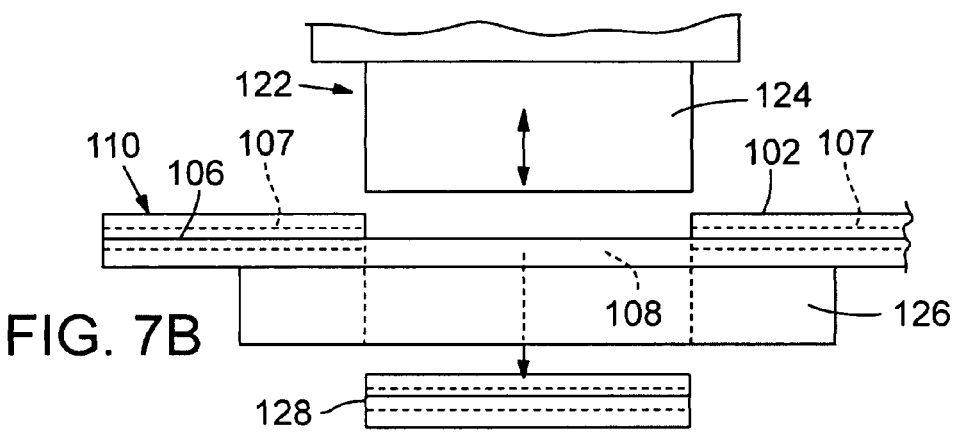
FIG. 7B illustrates a side view of an exemplary vertical die used to form a gap in a chain of plant ties.

FIG. 7B illustrates an alternative (e.g., vertical) die apparatus that can be used to form a series of openings 108 in a continuous assembly. The cutting die 124 of the vertical die apparatus 122, together with a corresponding anvil 126 for receiving the cutting die 124, can segment an otherwise continuous assembly into discrete lengths, for example by segmenting the wire. This forms a corresponding series of elongatable portions configured to engage, e.g., to be wrapped around, a portion of a plant. FIG. 8 illustrates an embodiment of such a chain of plant ties 110. In the embodiment of FIG. 7B, the slot formed in the gap 104 between the discrete lengths of wire provides an elongatable section having no non-elongatable member located between individual twisting members 102. For example, a portion 128 of the continuous wire and corresponding overlying material is removed, while leaving adjacent overlying material 106 in place that spans the gap 104 between adjacent ends of the wire to define an opening 108.

As noted above, an extrusion technique can continuously extrude an elongatable member formed of expandable material and insert a plurality of wire segments that form a plurality of spaced non-elongatable members 117 without the need for a separate die punching (e.g., using roller dice, or a vertical die) to form an embodiment as shown by FIG. 9. For example, a chain of plant ties 120 can have a plurality of spaced non-elongatable members 117 forming a series of gaps 114 without forming an opening therein. In these embodiments, the gap 114 between the discrete segments of non-elongatable members 114 forming the individual twisting members 112 can provide an elongatable section of overlying material 116 spanning the gap 114 without an opening.

As noted above in connection with FIG. 7A, the illustrated cross-sectional profile provides a substantially flat side 103. Plant ties having a flat side 103, 113, such as those formed from chains 110, 120, provide expandable portions with a flat side for engaging a plant. Such flat sides can provide substantially uniform pressure distribution and/or low surface pressure when engaging a plant compared to a side with one or more raised features. Plant ties configured without a flat side 103, 113 (e.g., a contoured surface) or with an opening 98, 108 can apply non-uniform pressure distribution when engaging a plant. In some but not all instances of use with delicate and/or ornamental plants uniform and/or low surface pressure is desirable to reduce health problems and/or aesthetic defects in the plant.

Although embodiments of the disclosed plant tie can be installed by hand, they also are amenable to automated installation. For example, once a plant tie is in position, a handheld, automated device can be used to twist its ends. Such a device may be useful to prevent hand fatigue associated with the installation of large numbers of plant ties.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A chain of plant ties, comprising:
a longitudinally-expandable member or a series of longitudinally-expandable member sections having a substantially constant lateral dimension;

a series of twisting member sections implanted in or otherwise attached to the longitudinally-expandable member or the series of expandable member sections, wherein an individual plant tie is removable from the chain of plant ties by cutting at a point along the length of one of the twisting member sections, the individual plant tie having a portion of one of the twisting member sections at each of its ends and a gap between the portions of the twisting member sections spanned by a portion of the longitudinally-expandable member, wherein the ends of the individual plant tie can be aligned and twisted together to form a closed loop, thereby defining an elongatable cradle configured to engage a plant and to expand in response to a force applied by the plant as the plant grows without injuring the plant.

2. The chain of plant ties according to claim 1, having a substantially solid cross section along substantially its entire length.

3. The chain of plant ties according to claim 1, wherein the length of the individual plant tie can be varied by cutting at a point along the length of one of the twisting member sections spaced apart from a free end of the chain of plant ties, with one or more intervening twisting member sections between the cutting point and the free end of the chain of plant ties.

4. A plant tie comprising:
at least a first elongatable member comprising a material having a modulus of elasticity less than about 5 GPa; and
at least first and second substantially non-elongatable members disposed within the at least first elongatable member and spaced longitudinally of each other, defining respective first and second securing portions and a gap between the respective first and second securing portions, wherein at least a portion of the at least first elongatable member spans the gap and defines, when the first and second securing portions are secured together, an elongatable plant engaging portion configured to engage a plant and elongate in response to a force applied to the plant engaging portion by a portion of the plant as the plant grows without causing an injury to the plant, and wherein the plant tie is substantially rectangular.

5. The plant tie according to claim 4, wherein the plant engaging portion comprises a flat side.

6. The plant tie of claim 4, wherein a slot is defined within the plant engaging portion.

7. The plant tie of claim 4, wherein at least one of the first and second substantially non-elongatable members comprises a wire segment.

8. The plant tie of claim 4, wherein the at least first elongatable member comprises a first ply of elongatable material and a second ply of elongatable material joining the first ply, and wherein the substantially non-elongatable members disposed within the at least first elongatable member are disposed between the first and second plies.

9. The plant tie of claim 4, wherein the first and second securing portions are configured for twisting together, and the plant engaging portion is configured to secure a plant to a support when the securing portions are twisted together.

10. The chain of plant ties of claim 1, wherein the longitudinally expandable member or the series of longitudinally expandable member sections comprise a material having a modulus of elasticity less than about 5 GPa.

11. The plant tie of claim 4, wherein the material comprises a vinyl polymer.

12. The plant tie of claim 4, wherein the material comprises a first material and one or more of the at least first and second non-elongatable members comprises a second material having a modulus of elasticity between about 5 GPa and about 500 GPa.

13. The plant tie of claim 12, wherein the modulus of elasticity of the first material is between about 0.1 GPa and about 3 GPa.

14. The plant tie according to claim 5, wherein the plant tie comprises a second side opposite the flat side, the second side having a raised feature corresponding to the first and second securing portions.

* * * * *